US006553484B1

(12) United States Patent
Sawamura

(10) Patent No.: US 6,553,484 B1
(45) Date of Patent: Apr. 22, 2003

(54) INSTRUCTION-ISSUING CIRCUIT THAT SETS REFERENCE DEPENDENCY INFORMATION IN A PRECEDING INSTRUCTION WHEN A SUCCEEDING INSTRUCTION IS STORED IN AN INSTRUCTION OUT-OF-ORDER BUFFER

(75) Inventor: Akihiro Sawamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/450,769

(22) Filed: Nov. 30, 1999

(30) Foreign Application Priority Data

Nov. 30, 1998 (JP) .......................................... 10-339366

(51) Int. Cl.[7] .............................. G06F 9/38; G06F 9/345
(52) U.S. Cl. ........................ 712/217; 712/237; 712/219; 712/207
(58) Field of Search .......................... 712/23, 217, 222, 712/214, 216, 206, 207, 215, 245, 226, 237, 219; 708/510, 490

(56) References Cited

U.S. PATENT DOCUMENTS

| 5,471,591 A | * | 11/1995 | Edmondson et al. ....... 712/217 |
| 5,761,105 A | * | 6/1998 | Goddard et al. ............. 712/222 |
| 5,812,812 A | | 9/1998 | Afsar et al. .................. 712/216 |
| 5,941,983 A | | 8/1999 | Gupta et al. ................. 712/214 |

FOREIGN PATENT DOCUMENTS

| JP | 10-154072 | 6/1998 |
| WO | WO 93/20505 | 10/1993 |
| WO | WO 94/16384 | 7/1994 |

OTHER PUBLICATIONS

Japanese Office Action; 339366, dated Oct. 24, 2000, with partial translation.
European Search Report, 99123697, dated Mar. 30, 2000.

* cited by examiner

Primary Examiner—Daniel H. Pan
(74) Attorney, Agent, or Firm—McGinn & Gibb, PLLC

(57) ABSTRACT

Each entry of an instruction out-of-order buffer 330 has a Y-operand referencing succeeding-entry information field 335 and a Z-operand referencing succeeding-entry information field 336. In the field 335, the entry number of a succeeding instruction that will reference the execution result of the instruction in the entry as the Y operand is stored. In the field 336, the entry number of a succeeding instruction that will reference the execution result of the instruction in the entry as the Z operand is stored. When the succeeding instruction is stored in the instruction out-of-order buffer 330, a reference relation setting circuit 320 sets the reference relation between the execution result of a preceding instruction and the operands of the succeeding instruction in the operand referencing succeeding-entry information fields of the preceding instruction. A ready flag setting circuit 340 reflects the fields 335 and 336 on ready flags 333 and 334 of the Y-operand and the Z-operand of the corresponding entry.

9 Claims, 6 Drawing Sheets

INSTRUCTION 1 : ADD S7, S2, S3 ; S7 ← S2 + S3

INSTRUCTION 2 : SUB S5, S7, S10 ; S5 ← S7 - S10

FIG. 5

INSTRUCTION-ISSUING CIRCUIT THAT SETS REFERENCE DEPENDENCY INFORMATION IN A PRECEDING INSTRUCTION WHEN A SUCCEEDING INSTRUCTION IS STORED IN AN INSTRUCTION OUT-OF-ORDER BUFFER

BACKGROUND OF THE INVENTION

The present invention relates to an instruction-issuing circuit, and more particularly to an instruction-issuing circuit that controls out-of-order instruction execution.

A popular method to increase the speed of a pipeline computer is to increase the clock speed and to reduce the time required to execute one instruction. In many cases, to increase the speed of a pipeline computer, the clock speed is increased and, at the same time, the fixed-point operation unit is designed so that it completes one unit of operation within one clock cycle. However, when the clock speed is based on the operation time of the fixed-point operation unit, it sometimes becomes difficult to perform other instruction control operations. In particular, the out-of-order instruction execution mode in which an instruction may be outstripped by another instruction becomes popular these days. This control mode requires more time.

For example, when a one-clock-cycle operation instruction is issued and then a succeeding instruction referencing the result of the preceding one-clock-cycle instruction is issued, all the control operations given below must be completed in one cycle.

(1) From an instruction out-of-order buffer (e.g. Reservation Station), select one instruction to be issued according to some priority. This instruction is one of those whose operands are ready and which can get the resources they require.

(2) Search the instruction out-of-order buffer for the succeeding instructions referencing the result of the selected instruction and set the operand ready flags of those succeeding instructions.

Conventionally, to check whether or not the operands are ready, the tag number attached to an instruction to be issued is compared with that of a succeeding instruction and, if they match, the operands of the succeeding instruction are determined as ready.

To implement out-of-order instruction execution in the conventional technology described above, a check is made to determine whether or not an instruction is ready to be issued and, if it is ready, the operand-ready information must be passed to the succeeding instructions. However, in the conventional system, the number of logic circuit stages required for this processing cannot be reduced any more and, therefore, the LSI manufacturing process prevents the clock speed from increasing.

SUMMARY OF THE INVENTION

The present invention seeks to solve the problems associated with the prior art described above. It is an object of the present invention to provide an instruction-issuing circuit which speeds up out-of-order instruction execution and increases the throughput of a pipeline computer.

In one preferred embodiment, each instruction waiting to be issued has an identifier of a succeeding instruction referencing an execution result of the instruction and, when the preceding instruction is issued, an issue condition for the succeeding instruction referencing the execution result of the preceding instruction is updated based on said identifier.

BRIEF DESCRIPTION OF THE DRAWINGS

Other features and advantages of the invention will be made more apparent by the detailed description hereunder, taken in conjunction with the accompanying drawings, wherein:

FIG. 5 is a diagram showing a string of instructions used to explain the operation of the embodiment of the present invention.

DESCRIPTION OF THE PREFERRED EMBODIMENTS

The present invention will be described in detail by referring to the attached drawings.

Figure 1:
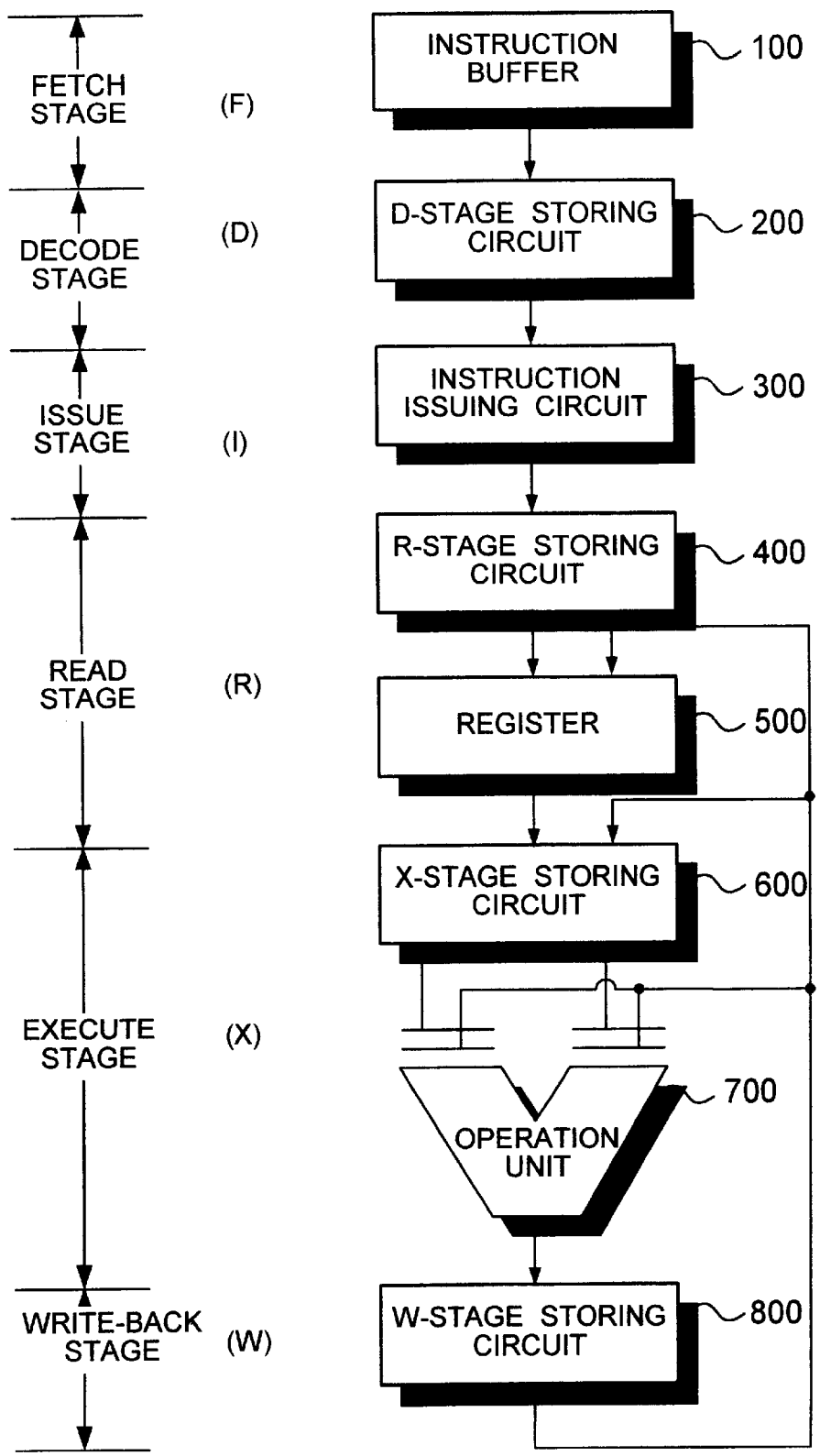
FIG. 1 is a block diagram showing an example of a pipeline computer to which an instruction-issuing circuit according to the present invention is applied.

Referring to FIG. 1, the execution of an instruction in a pipeline computer used in an embodiment of the present invention comprises a fetch stage, a decode stage, an issue stage, a read stage, an execute stage, and a write-back stage. In the fetch stage, a desired instruction is fetched from a memory (not shown in the figure) or an instruction buffer 100 and is stored in a D-stage storing circuit 200. In the decode stage, the instruction stored in the D-stage storing circuit 200 is decoded and is stored in an instruction out-of-order buffer (e.g. Reservation Station) in an instruction-issuing circuit 300 composed of a plurality of entries. In the issue stage, an instruction that can be issued is selected from the instructions stored in the instruction out-of-order buffer in the instruction-issuing circuit 300 and is stored in an R-stage storing circuit 400. In the read stage, the operands required for the instruction stored in the R-stage storing circuit 400 is read from a register 500 and the operands that were read, as well as the instruction, are stored in an X-stage storing circuit 600. In the execute stage, the issued instruction is executed by an operation unit 700 and other units and the execution result is stored in a W-stage storing circuit 800. In the case of a load instruction, data is read from a cache memory or a memory and is stored in the W-stage storing circuit 800. In the write-back stage, the execution result stored in the W-stage storing circuit 800 is written, for example, into the register 500.

The instructions stored in the instruction out-of-order buffer are executed in the order in which execution conditions are satisfied. At this time, an instruction whose execution condition is not satisfied may be outstripped by a succeeding instruction whose execution condition is satisfied. An instruction stored in the instruction out-of-order buffer in instruction-issuing circuit 300 is deleted once executed.

Data read from the cache and/or results produced by instruction execution are not only written into the register but also passed directly to the X-stage storing circuit 600 or the operation unit 700. This is called an operand bypass.

This operand bypass reduces the number of cycles required for data to be passed to a succeeding instruction referencing the execution result of a preceding instruction.

Figure 2:
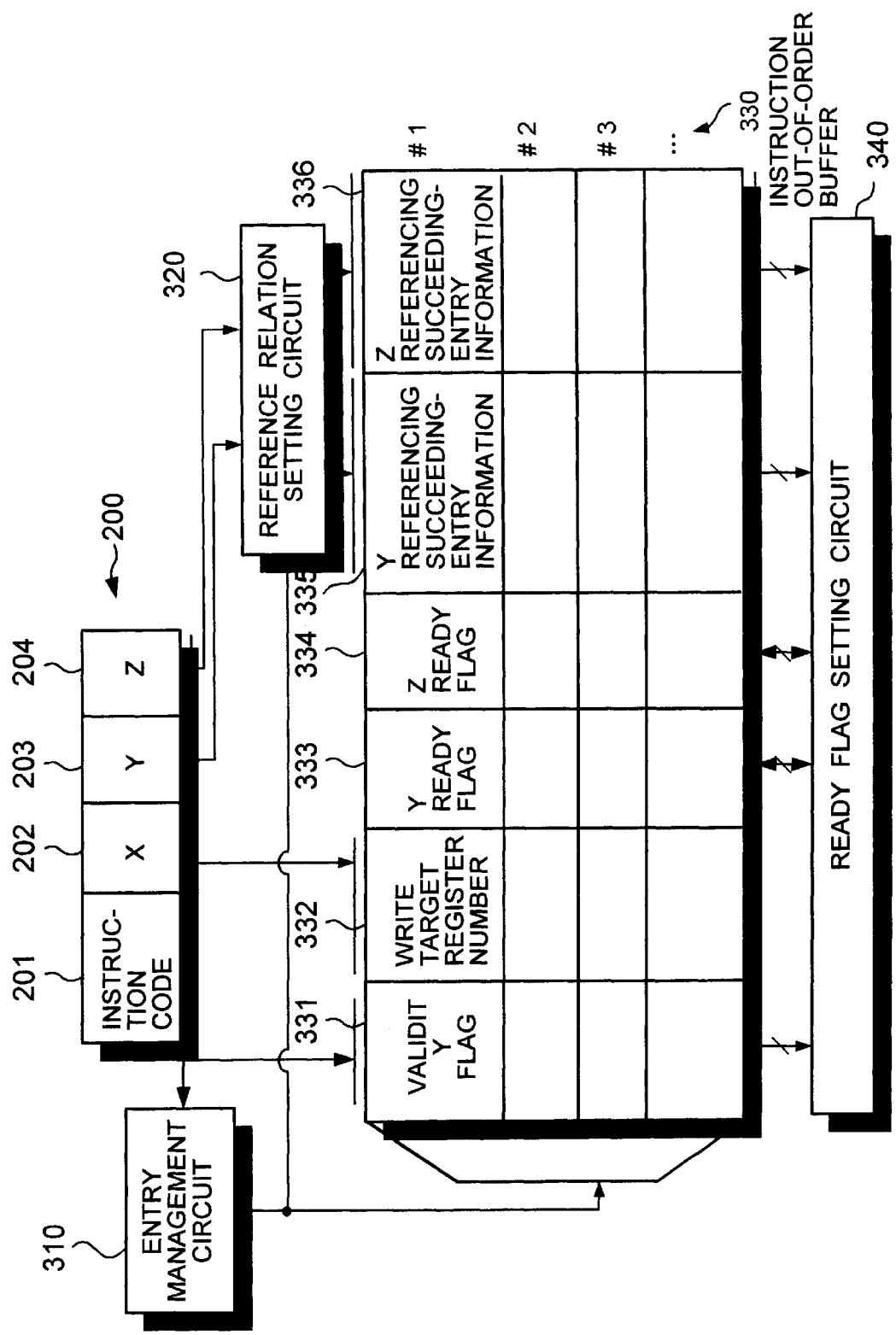
FIG. 2 is a block diagram showing the configuration of an embodiment of the instruction-issuing circuit according to present invention.

Referring to FIG. 2, the instruction-issuing circuit 300 used in the issue stage comprises an entry management circuit 310, a reference relation setting circuit 320, an instruction out-of-order buffer 330, and a ready flag setting circuit 340.

An instruction stored in the D-stage storing circuit 200 (e.g. instruction latch) comprises an instruction code field 201, an X-operand field 202, a Y-operand field 203, and a Z-operand field 204. The instruction code field 201 contains an instruction code (including an instruction type). Normally, the X-operand field 202 contains the write register number, the Y-operand field 203 contains the first read register number, and the Z-operand field 204 contains the second read register number.

The instruction out-of-order buffer 330 comprises a plurality of entries, each of which includes a validity flag 331, a write target register number field 332, a Y-operand ready flag 333, a Z-operand ready flag 334, a Y-operand referencing succeeding-entry information field 335, and a Z-operand referencing succeeding-entry information field 336. The validity flag 331 indicates whether the entry is "valid" or "invalid." The write target register number field 332 contains the number of a register into which the instruction writes the result. The Y-operand ready flag 333 and the Z-operand ready flag 334 indicate whether or not the Y operand or the Z operand may be referenced (ready), respectively. The Y-operand ready flag 333 and the Z-operand ready flag 334 are updated by the ready flag setting circuit 340.

The Y-operand referencing succeeding-entry information field 335 and the Z-operand referencing succeeding-entry information field 336 contain information about the position (that is, number) of an entry which contains a succeeding instruction which will reference the result of the instruction of this entry as the Y operand or the Z operand, respectively. The Y-operand referencing succeeding-entry information field present invention will be described with reference to the attached drawings.

Referring to FIG. 5, the instruction string used for operation description is composed of two instructions: instruction 1 and instruction 2. Instruction 1 is an addition instruction that adds up the contents of register S2 and those of register S3 and stores the result into register S7. Instruction 2 is a subtraction instruction that subtracts the contents of register S10 from the contents of register S7 and stores the result into register S5. That is, the value generated by instruction 1 is stored in register S7 and is referenced as the Y operand of instruction 2. How this operation is executed will be described by referring to the instruction string shown in FIG. 5.

Referring to FIGS. 1 to 4 and FIG. 6, instruction 1 is first read from the instruction buffer 100 into the D-stage storing circuit 200 at time T1. At time T2, instruction 1 is decoded and is stored into the instruction out-of-order buffer 330 of the instruction-issuing circuit 300. Assume that instruction 1 is stored in entry #3 of the instruction out-of-order buffer 330 of the instruction-issuing circuit 300. At the same time, instruction 2 is read from the instruction buffer 100 into the D-stage storing circuit 200.

At T3, instruction 2 is decoded and is stored in the instruction out-of-order buffer 330. Assume that instruction 2 is stored in entry #8 of the instruction out-of-order buffer 330 of the instruction-issuing circuit 300. At this time, the decoder 321 assets only the signal line corresponding to #8. Therefore, the contents of the X-operand field 202 of the D-stage storing circuit 200 are stored in the write target register number field 332-8 of entry #8 of the instruction out-of-order buffer 330. At the same time, the register number stored in the write target register number field 332-3 of entry #3 of the instruction out-of-order buffer 330 matches the 335 and the Z-operand referencing succeeding-entry information field 336 are each (number of entries of the instruction out-of-order buffer 330-1) bits in width. A bit in each of these fields corresponds to an entry, except this entry, of the instruction out-of-order buffer 330. The Y-operand referencing succeeding-entry information field 335 and the Z-operand referencing succeeding-entry information field 336 are set by the reference relation setting circuit 320.

The entry management circuit 310 keeps track of the usage status of the entries of the instruction out-of-order buffer 330. That is, from the entries whose validity flag 331 is "invalid", the circuit selects an entry into which a new instruction is to be stored. To do so, the circuit, forexample, selects from the "invalid" entries an entry with the smallest entry number. One example of such a circuit is a priority encoder. When a new instruction is stored in an entry, the validity flag 331 of the entry is set to "valid." On the other hand, when an instruction is issued from the instruction out-of-order buffer 330, the validity flag 331 of the entry from which the instruction is issued is set to "invalid."

Figure 3:
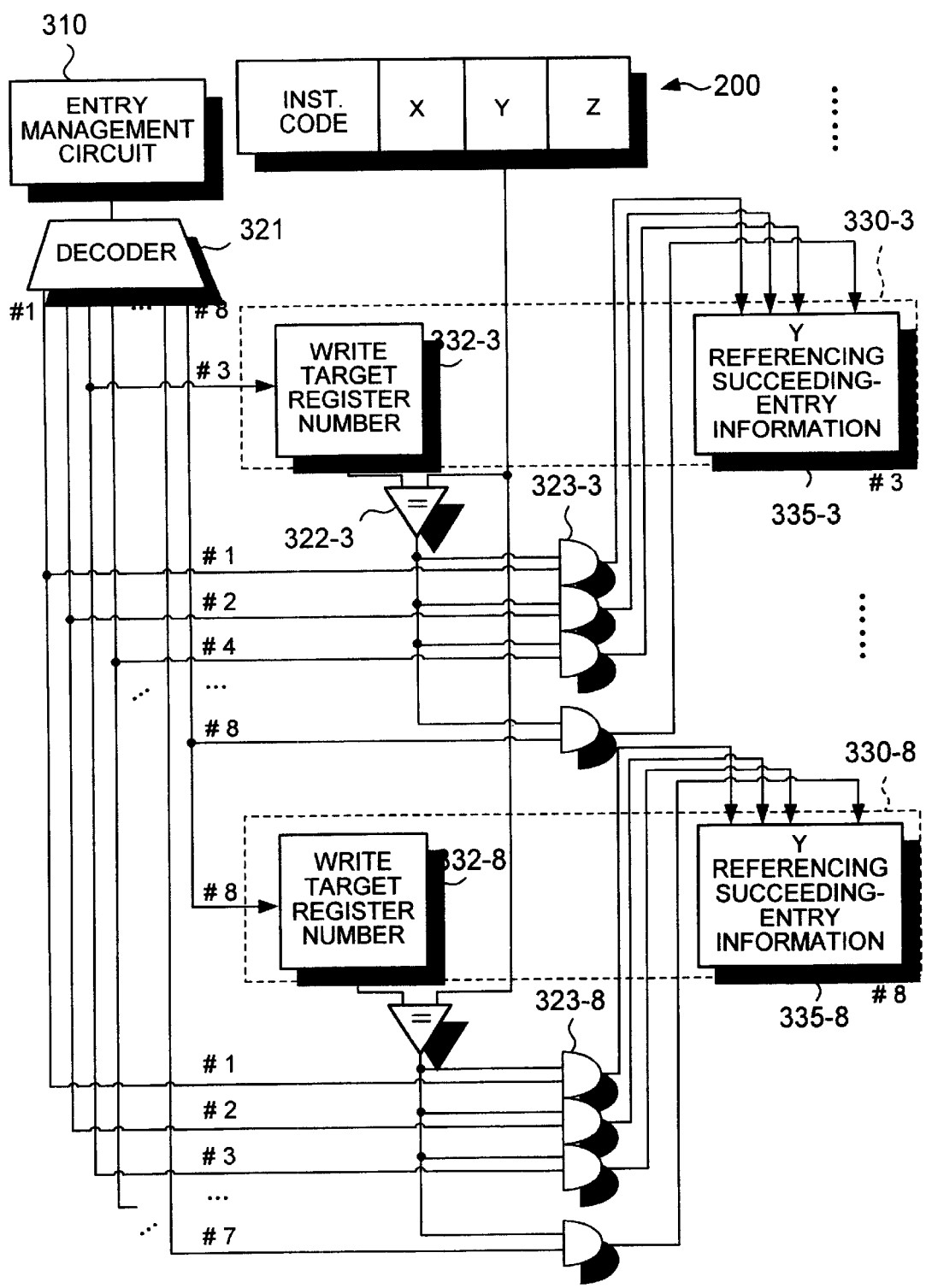
FIG. 3 is a block diagram showing the configuration of a reference relation setting circuit used in the embodiment of the present invention.

Referring to FIG. 3, the reference relation setting circuit 320 comprises a decoder 321, and comparators 322 and logical product circuits 323 each provided for an entry of the instruction out-of-order buffer 330. The decoder 321 decodes an entry number output from the entry management circuit 310, indicating the entry into which a new instruction is to be stored. For convenience, the instruction out-of-order buffer 330 is assumed to have eight entries, #1 to #8. Of course, the number of entries may be changed according to the system requirements. In this case, the decoder 321 has eight decode signal lines each corresponding to an entry.

The instruction stored in the D-stage storing circuit 200 is stored in one of the entries of the instruction out-of-order buffer 330 according to the output from the decoder 321. At the same time, the comparator 322 of each of the other entries compares the register number in the Y-operand field 203 and the register number in the Z-operand field 204 of the D-stage storing circuit 200 with the register number in the write target register number field 332 of that entry. If they match, the comparator 322 asserts its output. The logical product circuit 323 generates the logical product of the output from the comparator 322 and that from the decoder 321.

It should be noted that each entry of the instruction out-of-order buffer 330 has the logical product circuit 323 for each of the other entries of the instruction out-of-order buffer 330. For example, entry #3 of the instruction out-of-order buffer 330 has seven logical product circuits 323-3, that is, one for each of entries #1, #2, #4–#8. Similarly, entry #8 has seven logical product circuits 323-8, that is, one for each of entries #1–#7. The output from the logical product circuit 323 is stored in the Y-operand referencing succeeding-entry information field 335 and the Z-operand referencing succeeding-entry information field 336.

As described above, each time a succeeding instruction is added as an entry of the instruction out-of-order buffer 330, the reference relation setting circuit 320 sets the reference relation information in the Y-operand referencing succeeding-entry information field 335 and the Z-operand referencing succeeding-entry information field 336 of each of the preceding instructions. Thus, this reference relation information will be used later to quickly determine whether such a succeeding instruction may be issued.

Figure 4:
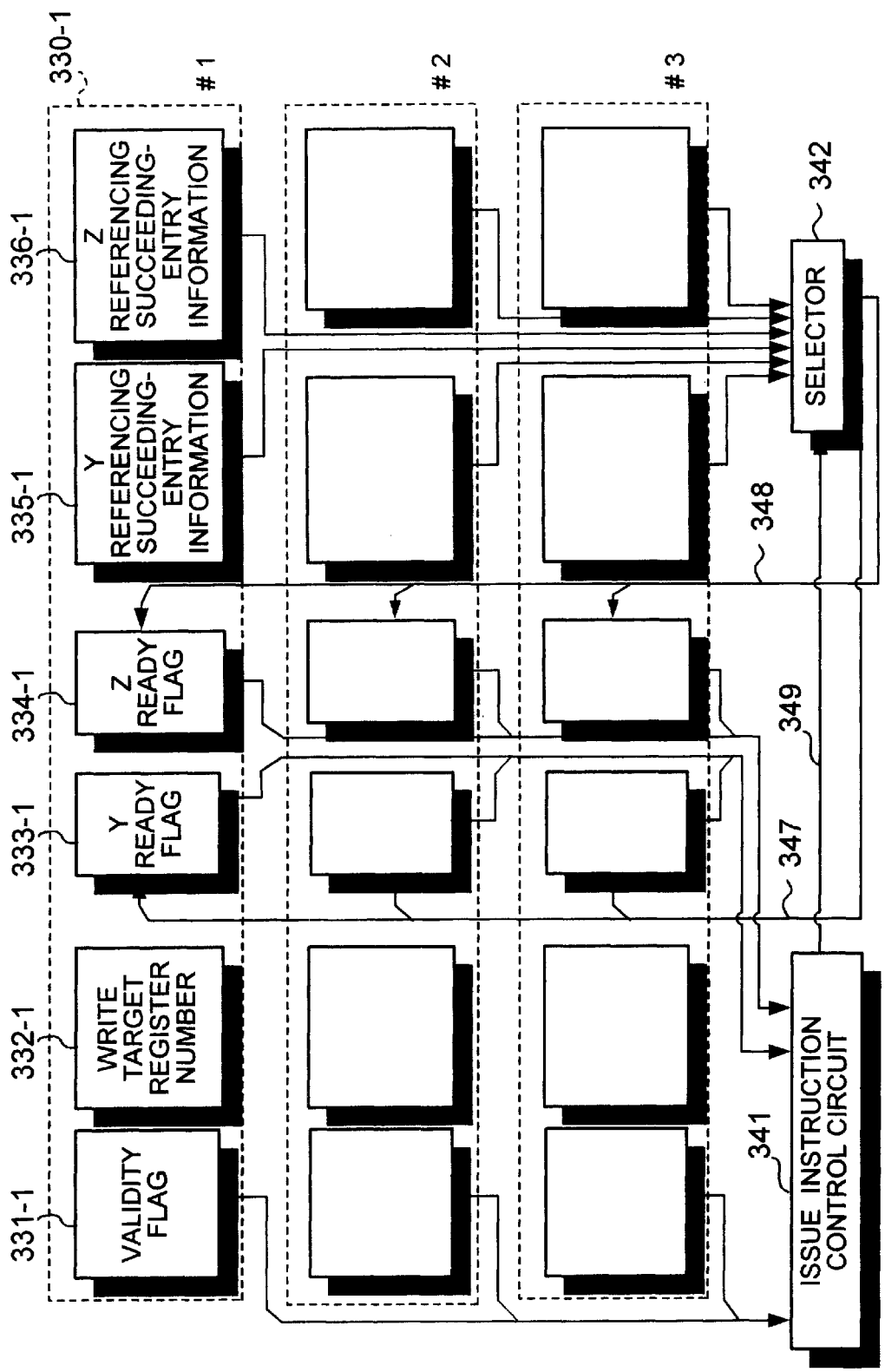
FIG. 4 is a block diagram showing the configuration of a ready flag setting circuit used in the embodiment of the present invention.
Figure 6:
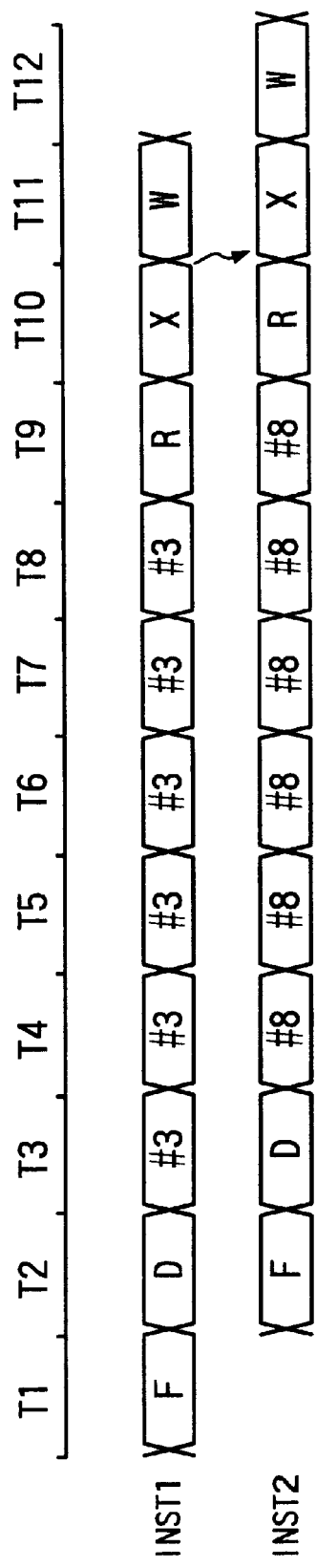
FIG. 6 is a timing diagram used to explain the operation of the embodiment of the present invention.

Referring to FIG. 4, the ready flag setting circuit 340 comprises an issue instruction control circuit 341 and a selector 342.

The issue instruction control circuit 341 searches the instruction out-of-order buffer 330 for an entry whose validity flag 331 is "valid" and whose Y-operand ready flag 333 and Z-operand ready flag 334 are "ready". If such an entry is found, the circuit selects the instruction as an instruction that may be issued. The selected entry number is sent via a signal line 349 to the selector 342 for use as the control signal.

The selector 342 outputs the Y-operand referencing succeeding-entry information field 335 and the Z-operand referencing succeeding-entry information field 336 contained in the entry specified by the issue instruction control circuit 341. It should be noted that, although the Y-operand referencing succeeding-entry information field 335 and the Z-operand referencing succeeding-entry information field 336 are each seven bits long, the selector 342 adds one extra bit for the entry itself and outputs eight bits. In this case, the added bit will never be asserted. The bits of the selected Y-operand referencing succeeding-entry information field 335 and the Z-operand referencing succeeding-entry information field 336 are set in the Y-operand ready flag 333 and the Z-operand ready flag 334, respectively. For example, when entry #8 is selected, the first bit of the seven bits contained in the Y-operand referencing succeeding-entry information field 335-8 of entry #8 is set in the Y-operand ready flag 333-1, the second bit is set in the Y-operand ready flag 333-2, and so on, and the seventh bit is set in the Y-operand ready flag 333-7. And, the logical low-level signal is sent to the Y-operand ready flag 333-8. Similarly, the contents of the Z-operand referencing succeeding-entry information field 336 are set in the Z-operand ready flag 334.

In this way, immediately after an instruction is issued, the Y operand ready flag or the Z operand ready flag of the succeeding instruction that references the write target register of the instruction that was issued may be set.

Next, the operation of the embodiment according to register number stored in the Y-operand field 203 of the D-stage storing circuit 200. That is, they are both S7. This asserts the value of the comparator 322-3, setting one of the input of each logical product circuit 323-3 high. Because the decoder 321 asserts only the signal line corresponding to #8, the bit corresponding to entry #8 of the Y-operand referencing succeeding-entry information field 335-3 goes high. On the other hand, assume that instruction 1 remains in the buffer as entry #3 because the issue conditions are not satisfied for some reason or other. In addition, assume that instruction 1 is not issued from T4 to T8. In this case, instruction 2 which waits for the result of instruction 1 cannot be issued either and remains in the buffer as #8.

When the issue conditions for instruction 1 are satisfied at T8, the issue instruction control circuit 341 detects that condition and sends the issue request to the selector 342. The selector 342 selects the Y-operand referencing succeeding-entry information field 335-3 and the Z-operand referencing succeeding-entry information field 336-3 of entry #3 and sets them in the Y-operand ready flag 333 and the Z-operand ready flag 334. Because only the bit corresponding to entry #8 of the Y-operand referencing succeeding-entry information field 335-3 is logically high, the Y-operand ready flag 333-8 corresponding to entry #8 is set.

At T9, the operands of instruction 1 issued at time 8 are read. Also, at T9, the issue condition for instruction 2 is satisfied because Y-operand ready flag 333-8 of entry #8 was set at T8. The issue instruction control circuit 341 detects this condition and sends the an issue request for entry #8 to the selector 342.

At T10, instruction 1 is executed by the operation unit 700, and the result is stored in the W-stage storing circuit 800. Also, at T10, the Z operand of instruction 2 is read from the register 500.

At T11, the operation result of instruction 1 stored in the W-stage storing circuit 800 is written into the register 500. At the same time, the operation result of instruction 1 stored in the W-stage storing circuit 800 is used as the first input to the operation unit 700, that is, as an input to the Y operand of instruction 2, through an operand bypass described above. This allows instruction 2 to be executed in the operation unit 700 at T11 with the result stored in the W-stage storing circuit 800. At T12, the operation result of instruction 2 stored in the W-stage storing circuit 800 is then written into the register 500.

As described above, in the embodiment of the present invention, the Y-operand referencing succeeding-entry information field 335 and the Z-operand referencing succeeding-entry information field 336 are provided in the instruction out-of-order buffer 330, and the numbers of entries, each referencing the execution result of the instruction as the Y operand or the Z operand, are set in advance in those fields. When the instruction is issued, the ready flag setting circuit 340 can immediately set the ready status of the Y operand and the Z operand into the Y-operand ready flag and the Z-operand ready flag 334.

It is apparent from the above description that the instruction-issuing circuit according to the present invention sets, in advance, the information about a succeeding instruction which will reference the execution result of a preceding instruction. Therefore, when the preceding instruction is issued, it is possible to immediately determine whether the succeeding instruction may be issued.

What is claimed is:

1. An instruction-issuing circuit comprising:
   an instruction out-of-order buffer which has a plurality of entries and in which an instruction waiting to be issued is stored in any of said plurality of entries;
   an entry management circuit which instructs into which entry of said plurality of entries of the instruction out-of-order buffer a new instruction will be stored;
   a reference relation setting circuit which, when said new instruction is stored, determines whether said new instruction will reference, as an operand, an execution result of a preceding instruction already stored in said instruction out-of-order buffer and, when it is determined that said new instruction will reference said execution result, sets an entry position into the entry in which said preceding instruction is stored, said entry position indicating the entry in which said new instruction is stored, and
   a ready flag setting circuit which, when said preceding instruction is issued, updates an issue condition for the instruction stored in said instruction out-of-order buffer according to the entry position set by said reference relation setting circuit.

2. The instruction-issuing circuit according to claim 1, wherein each of said plurality of entries of said instruction out-of-order buffer comprises a number of a write target register where the execution result of the instruction will be stored, a ready flag indicating whether or not an operand of the instruction is readable, and an operand referencing succeeding-entry information field in which the entry position of the succeeding instruction referencing the execution result of the instruction is stored, said entry position indicating one of the entries of the instruction out-of-order buffer.

3. The instruction-issuing circuit according to claim 2, wherein said operand referencing succeeding-entry information field comprises bits each corresponding to the entry in said instruction out-of-order buffer and wherein the bit corresponding to the entry of the succeeding instruction which will reference the execution result of the instruction as the operand is asserted.

4. The instruction-issuing circuit according to claim 3, wherein, when said new instruction is stored and if a write target register number stored in one of the entries of said instruction out-of-order buffer matches the register number specified by the operand of said new instruction, said reference relation setting circuit asserts the bit in said operand referencing succeeding-entry information field of the matching entry, said bit corresponding to the entry in which said new instruction is stored.

5. The instruction-issuing circuit according to claim 3, wherein, when said preceding instruction is issued, said ready flag setting circuit sets the bits of said operand referencing succeeding-entry information field into said ready flag of the corresponding entry to update the ready flag to a read ready status if the corresponding bit is asserted.

6. The instruction-issuing circuit according to claim 5, wherein said operand referencing succeeding-entry information field does not have the bit for the entry itself and wherein said ready flag setting circuit adds the bit corresponding to the entry itself to said operand referencing succeeding-entry information field before setting it in said ready flag.

7. The instruction-issuing circuit according to claim 5, wherein the instruction stored in each of said plurality of entries of said instruction out-of-order buffer includes a plurality of operands and wherein said ready flag and said operand referencing succeeding-entry information field are provided for each of said plurality of operands.

8. A pipeline computer having a multi-stage pipeline comprising:

an instruction out-of-order buffer which has a plurality of entries and in which an instruction waiting to be issued is stored in any of said plurality of entries;

an entry management circuit which instructs into which entry of said plurality of entries of the instruction out-of-order buffer a new instruction will be stored;

a reference relation setting circuit which, when said new instruction is stored, determines whether said new instruction will reference, as an operand, an execution result of a preceding instruction already stored in said instruction out-of-order buffer and, when it is determined that said new instruction will reference said execution result, sets an entry position into the entry in which said preceding instruction is stored, said entry position indicating the entry in which said new instruction is stored, and a ready flag setting circuit which, when a decision is made as to which entry of said instruction out-of-order buffer the instruction to be issued is stored and said preceding instruction is issued, updates an issue condition for the instruction stored in said instruction out-of-order buffer according to the entry position set by said reference relation setting circuit.

9. An instruction-issuing method for use in an instruction out-of-order buffer having a plurality of entries each containing an instruction waiting to be issued, wherein each of said plurality of entries comprises a ready flag indicating whether or not an operand of the instruction is readable and an operand referencing succeeding-entry information field in which an entry position of a succeeding instruction referencing an execution result of the instruction is stored, the succeeding instruction being within the instruction out-of-order buffer, said method comprising:

when the succeeding instruction referencing the execution result of the preceding instruction is stored in said instruction out-of-order buffer, setting the entry position of said succeeding instruction in the operand referencing succeeding-entry information field of the entry in which said preceding instruction is stored; and when said preceding instruction is issued, updating the ready flag in the entry in which said succeeding instruction is stored based on the operand referencing succeeding-entry information stored in the entry in which said preceding instruction is stored.

* * * * *